(12) United States Patent
Ganti et al.

(10) Patent No.: US 7,477,879 B1
(45) Date of Patent: Jan. 13, 2009

(54) TRANSCEIVER SYSTEM WITH COMMON RECEIVER AND TRANSMITTER OSCILLATOR

(75) Inventors: Ramkishore Ganti, Dripping Springs, TX (US); Caiyi Wang, Austin, TX (US)

(73) Assignee: Silicon Laboratories, Inc., Austin, TX (US)

(*) Notice: Subject to any disclaimer, the term of this patent is extended or adjusted under 35 U.S.C. 154(b) by 387 days.

(21) Appl. No.: 11/172,039

(22) Filed: Jun. 30, 2005

(51) Int. Cl.
*H04B 1/40* (2006.01)
(52) U.S. Cl. .............................. 455/88; 455/86; 455/76; 455/84; 455/78; 375/332; 375/376
(58) Field of Classification Search .................. 455/84, 455/73, 76, 86, 88, 78
See application file for complete search history.

(56) References Cited

U.S. PATENT DOCUMENTS

| | | | | |
|---|---|---|---|---|
| 5,276,913 A * | 1/1994 | Lee et al. ....................... 455/76 |
| 5,734,970 A | 3/1998 | Saito |
| 5,896,562 A * | 4/1999 | Heinonen ...................... 455/76 |
| 6,009,126 A * | 12/1999 | Van Bezooijen ............ 375/319 |
| 6,016,422 A * | 1/2000 | Bartusiak ...................... 455/76 |
| 6,195,563 B1 * | 2/2001 | Samuels ........................ 455/84 |
| 6,335,952 B1 * | 1/2002 | Lee et al. .................... 375/327 |
| 6,370,361 B1 * | 4/2002 | Hung et al. ................... 455/83 |
| 6,477,148 B1 * | 11/2002 | Gardenfors et al. .......... 370/280 |
| 6,510,185 B2 * | 1/2003 | Lee et al. .................... 375/327 |
| 6,553,209 B1 * | 4/2003 | Hornsby et al. ............... 455/76 |
| 6,633,550 B1 * | 10/2003 | Gardenfors et al. .......... 370/280 |
| 6,738,602 B1 * | 5/2004 | Heinen et al. ................. 455/76 |
| 6,781,424 B2 * | 8/2004 | Lee et al. ..................... 327/113 |
| 6,987,951 B2 * | 1/2006 | Boos ............................ 455/85 |
| 7,003,265 B2 * | 2/2006 | Jeon et al. ..................... 455/73 |
| 7,031,668 B2 * | 4/2006 | Darabi et al. .................. 455/75 |
| 7,068,171 B2 * | 6/2006 | Gardenfors et al. ....... 340/572.1 |
| 7,092,676 B2 * | 8/2006 | Abdelgany et al. ............. 455/76 |
| 7,116,706 B2 * | 10/2006 | Cook et al. .................. 375/219 |
| 7,145,410 B2 | 12/2006 | Corse et al. |
| 7,162,218 B2 * | 1/2007 | Axness et al. ................ 455/324 |
| 7,266,361 B2 * | 9/2007 | Burdett ........................ 455/334 |
| 7,272,366 B2 * | 9/2007 | Haapoja et al. ............ 455/114.2 |
| 7,343,146 B2 * | 3/2008 | Hallivuori et al. ............ 455/333 |

* cited by examiner

*Primary Examiner*—Marceau Milord
(74) *Attorney, Agent, or Firm*—Meyertons Hood Kivlin Kowert & Goetzel, P.C.; B. Noël Kivlin

(57) ABSTRACT

A transceiver system including a common receiver and transmitter oscillator. The transceiver system may include transmitter circuitry, receiver circuitry, and a first oscillator. The first oscillator may provide a transmit frequency to a mixer in the transmitter circuitry to generate a transmitter RF signal. Furthermore, the first oscillator may also provide the transmit frequency to a first stage mixer in the receiver circuitry to down-convert a receiver RF signal from a receive frequency to an intermediate frequency (IF). The receiver circuitry may include a second oscillator and a second stage mixer. The second oscillator may provide an IF frequency to the second stage mixer to down-convert receiver signals at IF to a lower frequency. The receiver circuitry may filter out transmitter RF feedthrough signals without using a SAW filter. The transmitter circuitry, the receiver circuitry, and the first oscillator may be included in a single IC.

19 Claims, 3 Drawing Sheets

TRANSCEIVER SYSTEM WITH COMMON RECEIVER AND TRANSMITTER OSCILLATOR

BACKGROUND OF THE INVENTION

1. Field of the Invention

This invention relates to communication apparatus including radio frequency (RF) circuits and, more particularly, to transceiver systems.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often important to minimize noise and interference from sources external or even internal to the communication apparatus.

Typical WCDMA (Wideband Code-Division Multiple Access) transceiver system architectures include separate receiver and transmitter chipsets. The main reason for implementing the receiver and transmitter circuits on different integrated circuits (ICs) is to avoid interference between the two circuits, since the receiver and transmitter are typically operating at the same time in WCDMA systems. However, despite integration of the receiver and transmitter circuits on separate ICs, typical transceiver systems may still suffer from transmitter feed through via the antenna.

To prevent or reduce transmitter feedthrough, typical WCDMA transceiver architectures may include two separate filtering stages in the receiver circuit. The first stage filtering is typically achieved via a duplexer and the second stage filtering is typically achieved through a surface acoustic wave (SAW) filter. In some systems, the SAW filter is implemented off-chip and may therefore increase the required pin count for the system.

Another problem that can sometimes be associated with typical WCDMA transceiver systems is power consumption. Most architectures include separate voltage-controlled oscillators (VCOs) for the receiver and transmitter circuits. Since VCOs are typically power hungry devices, these architectures can consume considerable amounts of power.

SUMMARY OF THE INVENTION

Various embodiments of a transceiver system including a common receiver and transmitter oscillator are disclosed. The transceiver system may include transmitter circuitry, receiver circuitry, and a first oscillator. In one embodiment, the first oscillator may provide a transmit frequency to a mixer in the transmitter circuitry to generate a transmitter RF signal. Furthermore, the first oscillator may also provide the transmit frequency to a first stage mixer in the receiver circuitry to down-convert a receiver RF signal from a receive frequency to an intermediate frequency (IF).

In one embodiment, the receiver circuitry may include a capacitor connected to an output of the first stage mixer. The capacitor may filter out unwanted transmitter feedthrough signals that leak into the receiver circuitry. In various embodiments, the receiver circuitry may filter out unwanted transmitter feedthrough signals without using a surface acoustic wave (SAW) filter.

The receiver circuitry may further include a second oscillator and a second stage mixer. The second oscillator may provide an IF frequency to the second stage mixer to down-convert receiver signals at IF to a lower frequency. In one embodiment, the transmitter circuitry, the receiver circuitry, and the first oscillator may be implemented on a single IC. The first oscillator may be implemented using an LC-based voltage controlled oscillator (VCO), while the second oscillator may be implemented using a ring oscillator.

Figure 1:
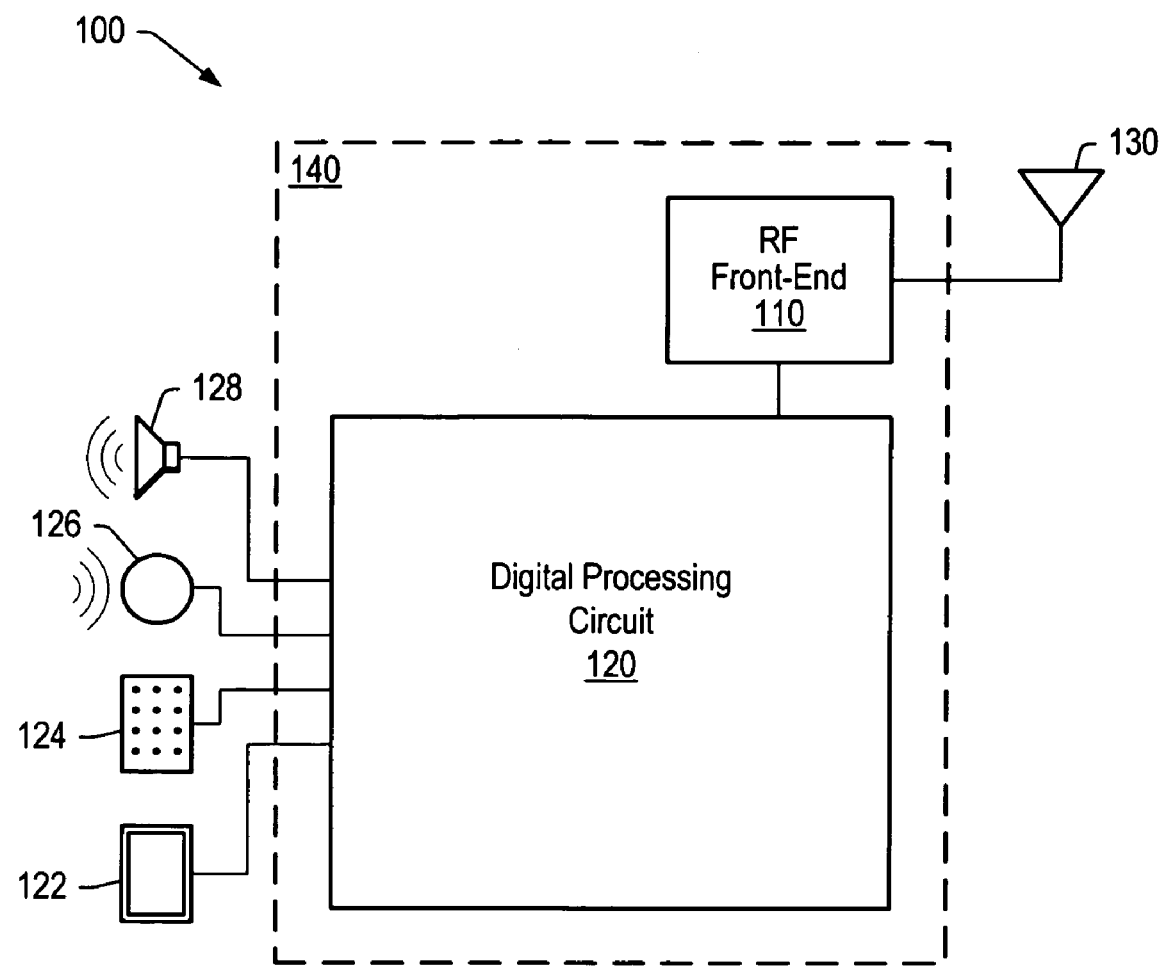
FIG. 1 is a block diagram of one embodiment of a communication apparatus including an RF front-end.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Communication Apparatus

Turning now to FIG. 1, a generalized block diagram of a communication apparatus 100 is shown. In the depicted embodiment, communication apparatus 100 includes a radio frequency (RF) front-end circuit 110 coupled to a digital processing circuit 120. Various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components not shown in FIG. 1 and/or exclude one or more of the illustrated components, depending on the desired functionality.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF transceiver functionality.

The communication apparatus 100 may be configured to implement one or more specific communication protocols or standards, including protocols in which transmission and reception operations occur concurrently. For example, in one embodiment, the communication apparatus 100 may implement WCDMA. It is noted however that in other embodiments the communication apparatus 100 may implement other communication protocols, for example, CDMA (Code-Division Multiple Access).

RF front-end circuit 110 includes receiver circuitry and transmitter circuitry operable to transmit and receive RF signals. As such, RF front-end circuit 110 may up-convert a signal from digital processing circuit 120 to an RF frequency for transmission, and may down-convert a received RF signal to a lower frequency (e.g., baseband) for subsequent processing by digital processing circuit 120. As will be described in further detail below, a common oscillator may be employed in association with the receiver and transmitter circuitry of the RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP (not shown in FIG. 1), as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

In one embodiment, RF front-end circuit 110 and digital processing circuit 120 may be integrated on the same integrated circuit die 140. It should be noted that the components described with reference to FIG. 1 are meant to be exemplary only, and are not intended to limit the invention to any specific set of components or configurations. For example, in some embodiments, RF front-end circuit 110 and digital processing circuit 120 may be included in two or more integrated circuits. Additionally, in various embodiments, the communication apparatus 100 may be implemented entirely using analog components, and thus the digital processing circuit 120 may be omitted.

Transceiver System

Figure 2:
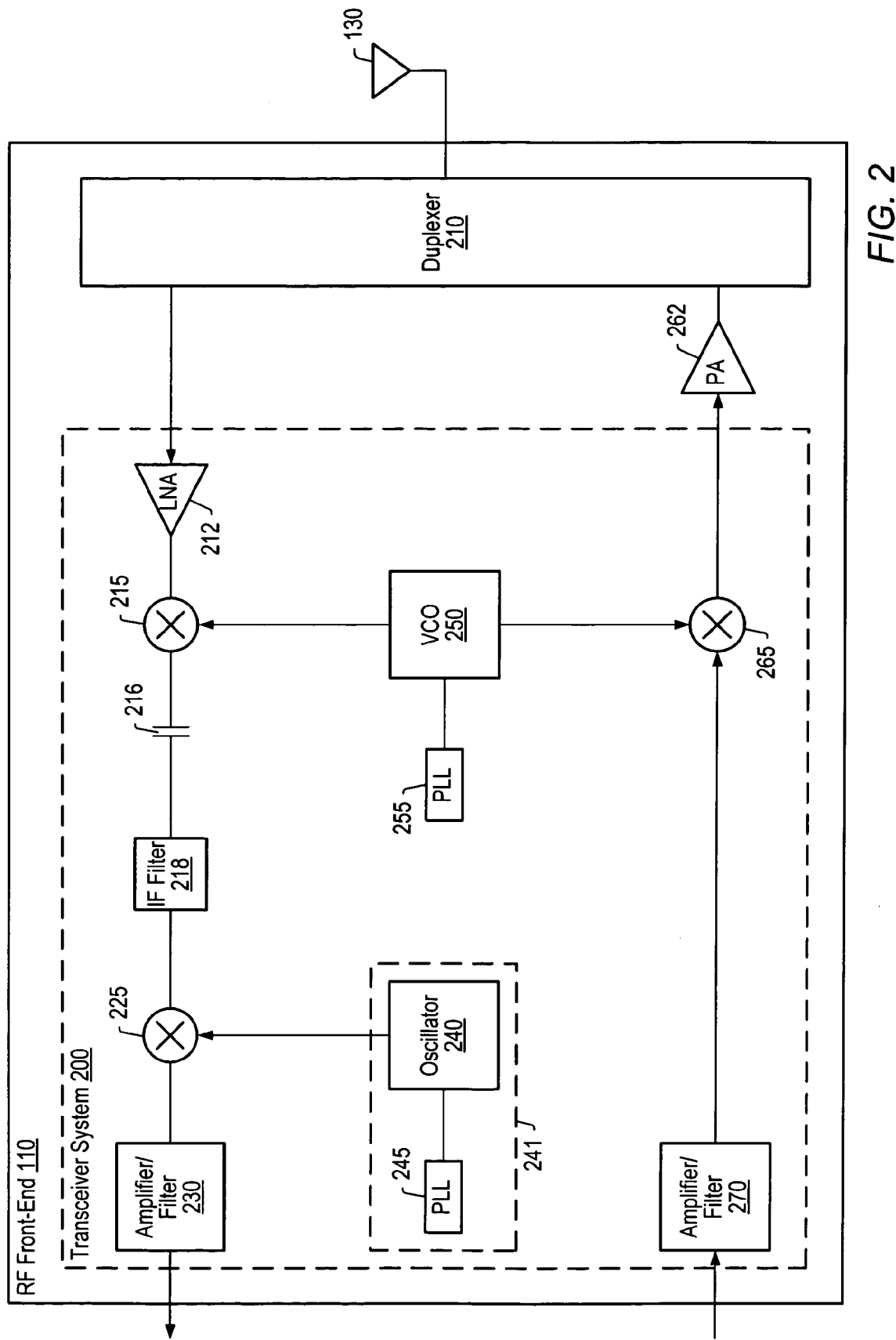
FIG. 2 is a block diagram of one embodiment of the RF front-end circuit including a transceiver system having a common transmitter and receiver oscillator.

FIG. 2 is a block diagram of one embodiment of the RF front-end circuit 110. As illustrated, in this particular embodiment the RF front-end circuit 110 includes a transceiver system 200, a power amplifier (PA) 262, and a duplexer 210. The RF front-end circuit 110 may be connected to antenna 130 to provide RF reception and RF transmission capabilities. As described above, the communication system may implement a WCDMA communication protocol, although systems that implement other standards (e.g., CDMA) are possible.

Transceiver system 200 may include receiver circuitry to down-convert a received RF signal to baseband. Also, the transceiver system 200 may include transmitter circuitry to up-convert a baseband signal to an RF signal for transmission via the antenna 130. In one embodiment, the receiver circuitry may be formed by a low-noise amplifier (LNA) 212, a first stage mixer 215, a capacitor 216, an intermediate frequency (IF) filter 218, a second stage mixer 225, a ring oscillator 240, a phase-locked loop (PLL) 245, and an amplifier/filter circuit 230. The transmitter circuitry may be formed by an amplifier/filter circuit 270 and a mixer 265. Furthermore, the transceiver system 200 may include a voltage-controlled oscillator (VCO) 250 and an associated PLL 255.

Duplexer 210 is provided to allow the communication system to receive and transmit RF signals via a single antenna (e.g., antenna 130). Duplexer 210 may further provide filtering functions, such as image rejection. In the illustrated embodiment, the duplexer 210 is connected to a receiver input of the transceiver system 200 and to the output of the PA 262. The PA 262 may amplify an RF signal generated by the transmitter circuitry of the transceiver system 200 before transmission via the antenna 130.

In one embodiment, the receiver circuitry, transmitter circuitry, and the VCO 250 may be included in a single integrated circuit (IC). It should be noted that in other embodiments, the receiver circuitry, transmitter circuitry, and the VCO 250 may be included in two or more ICs. Additionally, in various embodiments, one or more of the components described may be omitted, combined, modified, or additional components included, as desired.

During operation, the amplifier/filter circuit 270 may receive a signal to be transmitted. For example, the signal to be transmitted may be a baseband signal (e.g., a signal at DC) provided from the digital processing circuit 120 of FIG. 1. The amplifier/filter circuit 270 may amplify and filter the baseband signal in preparation for an up-conversion operation. In some embodiments, the amplifier/filter circuit 270 may include a programmable gain amplifier (PGA) and a low-pass filter. It is noted that in various embodiments other types of amplifiers and filters may be used.

The mixer 265 may receive the amplified and filtered baseband signal and may up-convert the signal to RF. The up-conversion process may include the VCO 250 providing a transmit frequency to the mixer 265. In the depicted embodiment, the mixer 265 up-converts the baseband signal to the transmit frequency to generate an RF signal for transmission (i.e., a transmitter RF signal). The transmit frequency provided by the VCO 250 may be controlled by PLL 255. In various embodiments, the VCO 250 may be implemented using an LC-based oscillator. The VCO 250 may additionally include divider circuitry to derive the transmit frequency. It is noted that the VCO 250 may be implemented using other types of oscillators in alternative embodiments. It is also noted that in some embodiments the PLL 255 may be replaced with other devices that control a frequency of the oscillator.

Furthermore, during operation, an RF signal (i.e., receiver RF signal) may be received at the antenna 130 and may be provided to the LNA 212 of the receiver circuitry via the duplexer 210. Since the receiver RF signal is typically very weak, the LNA 212 may amplify the signal before mixing by the first stage mixer 215. The LNA 212 may be used to achieve gains and low noise over a wide frequency range of operation.

The first stage mixer 215 may receive the amplified receiver RF signal and may down-convert the signal to an intermediate frequency (IF). In the illustrated embodiment, the same VCO 250 that provides the transmit frequency to the transmitter circuitry is coupled to the first stage mixer 215, and the transmit frequency is used to down-convert the receiver RF signal.

In addition to down-conversion of the receiver RF signal, when a transmitter RF feedthrough signal leaks into the receiver circuitry (e.g., through duplexer 210), the first stage mixer 215 may down-convert the transmitter RF feedthrough signal to a baseband frequency since the transmit frequency is used in the mixing operation of mixer 215. In the illustrated embodiment, the transceiver system 200 includes a capacitor 216 coupled to an output of the first stage mixer 215 to filter out this transmitter RF feedthrough signal at baseband (e.g., DC). In one embodiment, the capacitor 216 may be a DC blocking capacitor. It is noted however that in other embodiments the capacitor 216 may be replaced with other devices having a similar functionality, i.e., to filter out transmitter RF feedthrough signals.

To illustrate this operation, in one exemplary situation, the transmitter RF feedthrough signal may be at 1.9 GHz (e.g., the transmit frequency) and the receiver RF signal may be at 2.1 GHz. In such an example, the first stage mixer 215 may down-convert the transmitter RF feedthrough signal to a baseband frequency (e.g., DC) using the transmit frequency (e.g., 1.9 GHz) derived from the VCO 250, and the first stage mixer 215 may also down-convert the receiver RF signal (at 2.1 GHz) to 200 MHz (i.e., IF). After the down-conversion operations, the blocking capacitor 216 may filter out the transmitter RF feedthrough signal, and the desired signal at IF can be subsequently processed. It is noted that in other embodiments the transmitter RF feedthrough signal and the receiver RF signal may be at other frequencies, as desired.

The IF Filter 218 may filter the receiver signal at IF before the second stage mixer 225 down-converts the receiver signal from IF to a lower frequency. In one embodiment, the IF filter 218 may be a tunable IF filter, e.g., for multi-band architectures. Also, in other embodiments the IF filter 218 may include a gain adjustment mechanism. It is noted that in further embodiments the IF Filter 218 may be replaced with other types of filters.

In the illustrated embodiment, the oscillator 240 is coupled to the second stage mixer 225 and the PLL 245 is connected to the oscillator 240. During operation, the oscillator 240 provides an IF frequency to the mixer 225 to down-convert the receiver signal from IF to a lower frequency. In one embodiment, the mixer 225 down-converts the receiver signal from IF to a baseband frequency (e.g., DC). In other embodiments, the mixer 225 may down-convert the receiver signal to other frequencies, e.g., a low-IF frequency. The IF frequency provided by the oscillator 240 may be controlled by PLL 245. In various embodiments, the oscillator 240 may be implemented using a ring oscillator. The oscillator 240 may additionally include divider circuitry to derive the IF frequency. It is noted that the oscillator 240 may be implemented using other types of oscillators in alternative embodiments.

After the second stage down-conversion process, the resulting down-converted signal may be provided to the amplifier/filter circuit 230 in preparation for further processing, for example, by the digital processing circuit 120 shown in FIG. 1. In some embodiments, the amplifier/filter circuit 230 may include a programmable gain amplifier (PGA) and a low-pass filter.

In various embodiments, the combination of the common receiver and transmitter VCO 250 and the capacitor 216 may allow the receiver circuitry of the transceiver system 200 to eliminate (or reduce) transmitter RF feedthrough signals without the use of one or more external or off-chip filters, e.g., an external surface acoustic wave (SAW) filter. In some embodiments, transmitter RF feedthrough signals may be eliminated (or reduced) without the use of an internal SAW filter. It is noted however that in other embodiments one or more SAW filters (not shown) may be included on-chip and/or off-chip in the transceiver system 200.

It is noted that the transceiver system 200 may save considerable amounts of power by using the same VCO (e.g., an LC-based oscillator) for both the transmitter circuitry and the receiver circuitry. The power consumption of the transceiver system 200 may be further improved by using a ring oscillator rather than an LC-based VCO at the second stage of the receiver circuitry. Additionally, ring oscillators may be easier to shield than LC-based VCOs. In one embodiment, as shown in FIG. 2, a shielding 241 may be included to isolate the ring oscillator and/or the PLL 245 from the rest of the circuit, which may help the spurious performance of the architecture.

In some embodiments, the features described above may be implemented in a single-band or a multi-band architecture. Also, the VCO 250 may be tunable to derive the desired frequency for the first stage down-conversion operation performed by the receiver circuitry and for the up-conversion operation performed by the transmitter circuitry. In various embodiments, one or more of the mixers 215, 225, and 265 may implemented using quadrature mixers. In addition, the signal lines of the transceiver system 200 may be differential lines.

It is further noted that in various embodiments, after the receiver signals at IF are down-converted to a lower frequency by the second stage mixer 225, the down-converted signals may be digitized before the filtering and gain stage. In another embodiment, the receiver signals at IF may be down-converted to a low-IF frequency by the second stage mixer 225. In such an embodiment, after the down-conversion operation, the receiver signals at the low-IF frequency may be digitized and may then be provided to the amplifier and filter stage. Also, these signals may be further down-converted by a third stage mixer to a baseband frequency (e.g., DC). In yet other embodiments, the configuration may vary depending on the required specifications.

Figure 3:
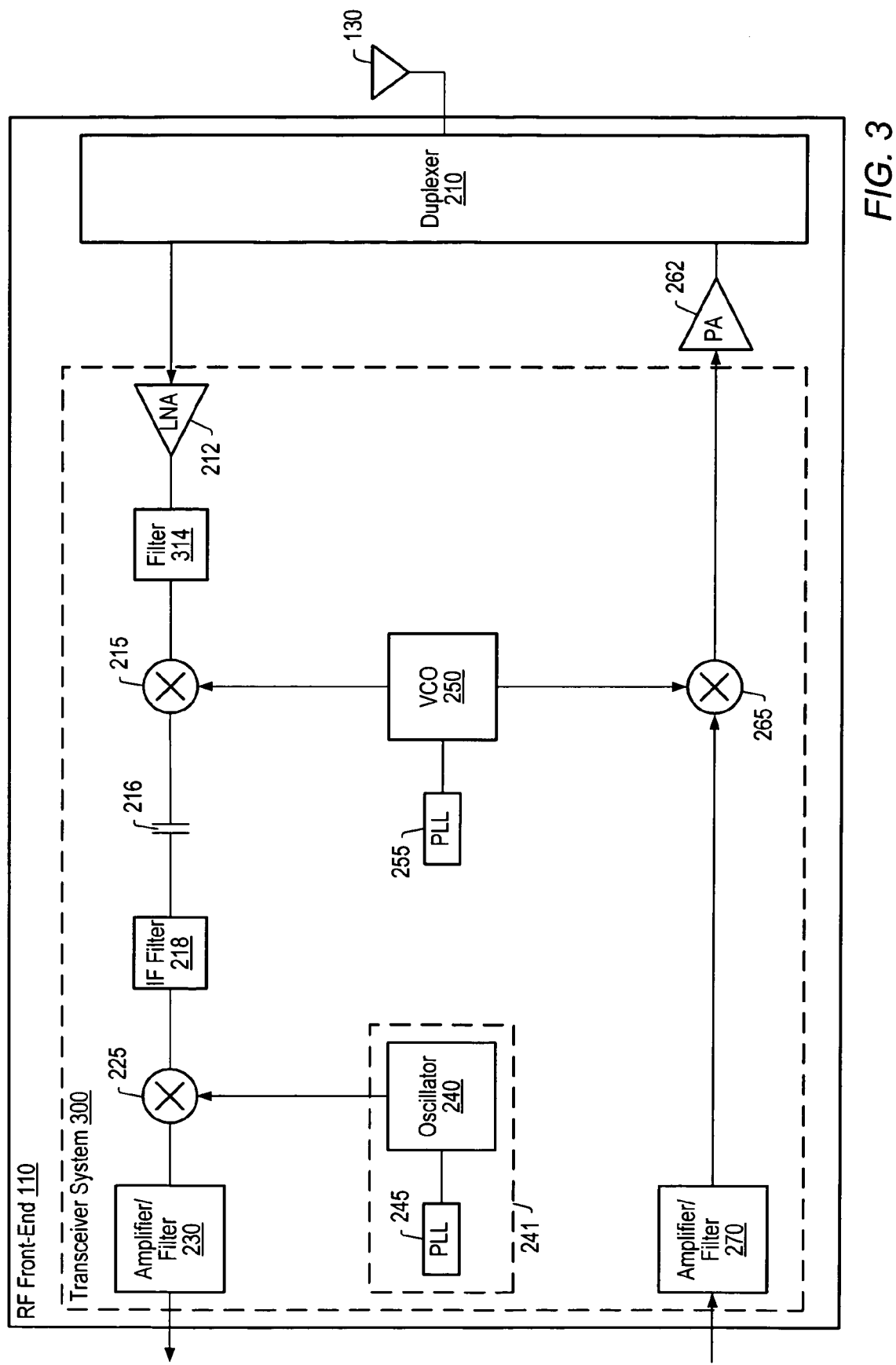
FIG. 3 is a block diagram of another embodiment of the RF front-end circuit including a transceiver system having a common transmitter and receiver oscillator.

FIG. 3 is a block diagram of another embodiment of the RF front-end 110 including the transceiver system 300. The transceiver system 300 of FIG. 3 is similar to the transceiver system 200 of FIG. 2 except that the transceiver system 300 includes additional RF filtering. In the depicted embodiment, the receiver circuitry includes a filter 314 between the LNA 212 and the first stage mixer 215 to filter the receiver RF signals. The filter 314 may filter out image frequencies and/or transmitter feedthrough signals. It is noted that in other embodiments the filter 314 may be replaced with other types of filters, e.g., a SAW filter.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A transceiver system comprising: transmitter circuitry configured to generate a transmitter radio frequency (RF) signal; a first oscillator coupled to a mixer in the transmitter circuitry and configured to provide a transmit frequency signal to the mixer to generate the transmitter RF signal; receiver circuitry configured to receive a receiver RF signal; wherein the first oscillator is coupled to a first stage mixer in the receiver circuitry and configured to provide the transmit frequency signal to the first stage mixer to down-convert the receiver RF signal from a receive frequency to an intermediate frequency (IF); wherein the first stage mixer is configured to down-convert the transmitter feedthrough RF signal from the transmit frequency to a baseband frequency; and a capacitor coupled in series to an output of the first stage mixer and configured to filter out a transmitter RF feedthrough signal at the baseband frequency.

2. The transceiver system of claim 1, wherein the receiver circuitry is configured to filter out the transmitter RF feedthrough signal without using an external filter.

3. The transceiver system of claim 1, wherein the receiver circuitry is configured to filter out the transmitter RF feedthrough signal without using a surface acoustic wave (SAW) filter.

4. The transceiver system of claim 3, wherein the receiver circuitry further comprises an IF filter coupled to the capacitor.

5. The transceiver system of claim 1, further comprises a phase-locked loop (PLL) operable to drive the first oscillator.

6. The transceiver system of claim 1, further comprising a second oscillator coupled to the receiver circuitry, wherein the second oscillator is configured to provide an IF frequency to the receiver circuitry to down-convert the receiver IF signal to a lower frequency.

7. The transceiver system of claim 6, wherein the first oscillator is an LC-based voltage-controlled oscillator (VCO) and the second oscillator is a ring oscillator.

8. The transceiver system of claim 6, wherein the receiver circuitry further comprises a second stage mixer coupled to the second oscillator, wherein the second oscillator is configured to provide an IF frequency to the second stage mixer to down-convert the receiver IF signal to a lower frequency.

9. The transceiver system of claim 1, further comprising divider circuitry to derive the transmit frequency signal.

10. The transceiver system of claim 1, configured to implement WCDMA protocol.

11. The transceiver system of claim 1, configured to implement CDMA protocol.

12. The transceiver system of claim 1, wherein the transmitter circuitry and the receiver circuitry operate concurrently.

13. The transceiver system of claim 1, wherein the transmitter circuitry, the receiver circuitry, and the first oscillator are included in a single IC.

14. The transceiver system of claim 1, wherein the transmitter circuitry, the receiver circuitry, and the first oscillator are included in two or more ICs.

15. A method for processing RF signals in a transceiver system, wherein the transceiver system includes receiver circuitry, transmitter circuitry, and a first oscillator, the method comprising: the first oscillator providing a transmit frequency signal to a mixer in the transmitter circuitry to generate a transmitter RF signal; the receiver circuitry receiving a receiver RF signal; the first oscillator further providing the transmit frequency signal to a first stage mixer in the receiver circuitry to down-convert the receiver RF signal from a receive frequency to an intermediate frequency (IF); the first stage mixer down-converting a transmitter RF feedthrough signal from the transmit frequency to a baseband frequency; and filtering out a transmitter RF feedthrough signal at the baseband frequency using a capacitor coupled in series to an output of the first stage mixer.

16. The method of claim 15, wherein said filtering out a transmitter RF feedthrough signal includes filtering out the transmitter RF feedthrough signal without using a SAW filter.

17. The method of claim 15, wherein the receiver circuitry further includes a second oscillator and a second stage mixer, wherein the method further includes the second oscillator providing an IF frequency to the second stage mixer and the second stage mixer down-converting the receiver IF signal to a lower frequency.

18. A communication system comprising: an antenna configured to transmit and receive RF signals; and a transceiver system coupled to the antenna and including: transmitter circuitry configured to generate a transmitter RF signal; a first oscillator coupled to a mixer in the transmitter circuitry and configured to provide a transmit frequency signal to the mixer to generate the transmitter RF signal; and receiver circuitry configured to receive a receiver RF signal; wherein the first oscillator is coupled to a first stage mixer in the receiver circuitry and configured to provide the transmit frequency signal to the first stage mixer to down-convert the receiver RF signal from a receive frequency to an intermediate frequency (IF); wherein the first stage mixer is configured to down-convert the transmitter feedthrough RF signal from the transmit frequency to a baseband frequency; and a capacitor coupled in series to an output of the first stage mixer and configured to filter out a transmitter RF feedthrough signal at the baseband frequency.

19. A WCDMA communication system comprising:
an antenna configured to transmit and receive RF signals; and
a transceiver system coupled to the antenna and including:
transmitter circuitry configured to generate a transmitter RF signal;
a first oscillator coupled to a mixer in the transmitter circuitry and configured to provide a transmit frequency signal to the mixer to generate the transmitter RF signal;
receiver circuitry configured to receive a receiver RF signal, wherein the receiver circuitry includes a first stage mixer and a second stage mixer;
a capacitor coupled in series to an output of the first stage mixer and configured to filter out a transmitter RF feedthrough signal;
wherein the first oscillator is further configured to provide the transmit frequency signal to the first stage mixer to down-convert the receiver RF signal to an IF frequency; and
a second oscillator coupled to the receiver circuitry, wherein the second oscillator is configured to provide an IF frequency to the second stage mixer to down-convert the receiver IF signal to a lower frequency.

* * * * *